H. H. WILSON.
DOUGH MIXING APPARATUS.
APPLICATION FILED MAR. 14, 1908.
946,300.
Patented Jan. 11, 1910.
2 SHEETS—SHEET 1.
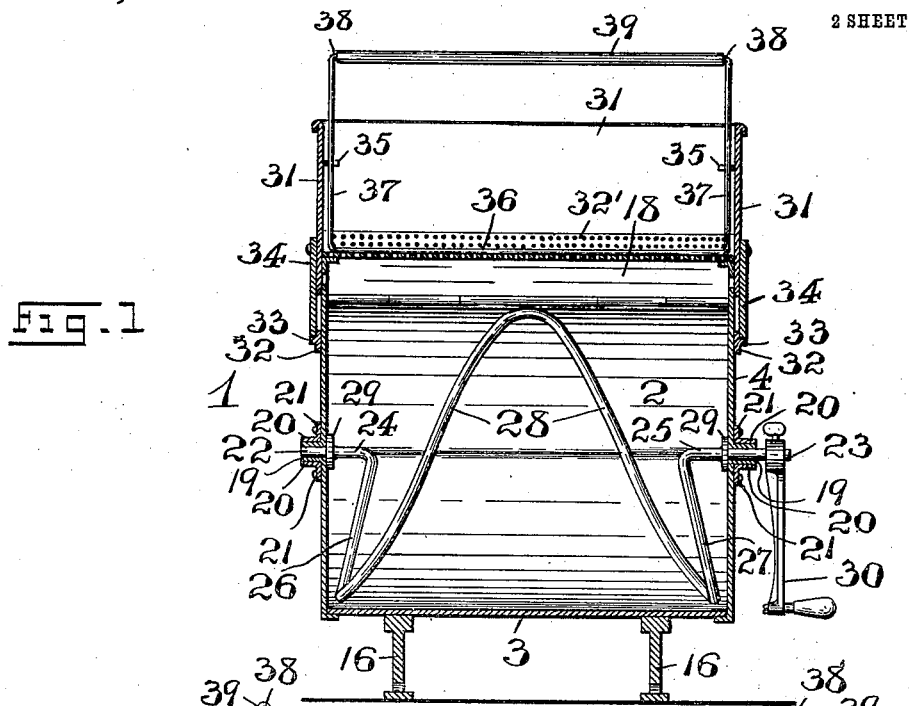
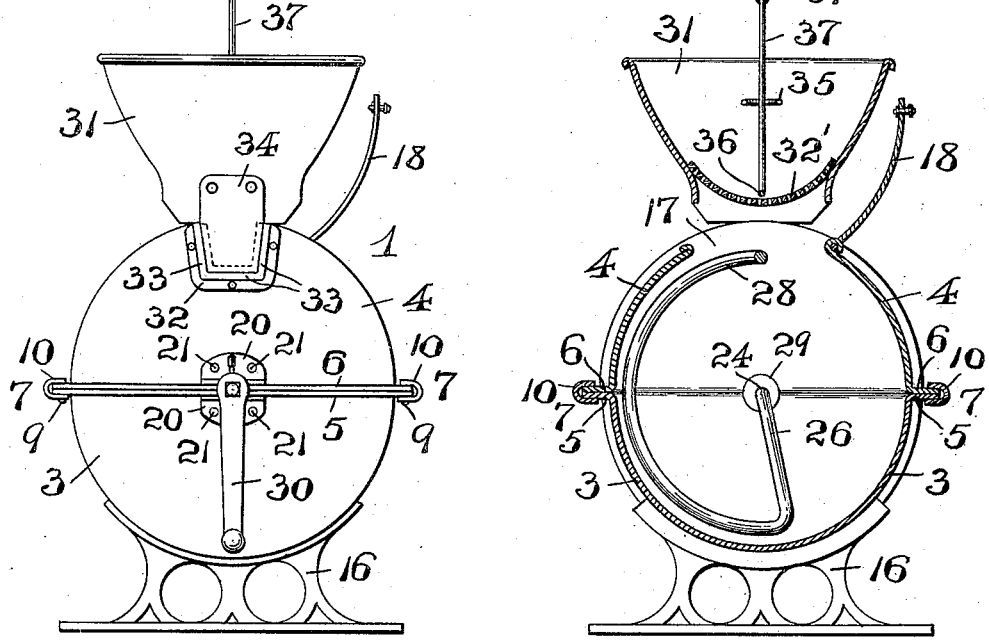
WITNESSES:
F. H. W. Fraentzel
Anna H. Alter
INVENTOR:
Harry H. Wilson,
BY
Fraentzel and Richards
ATTORNEYS

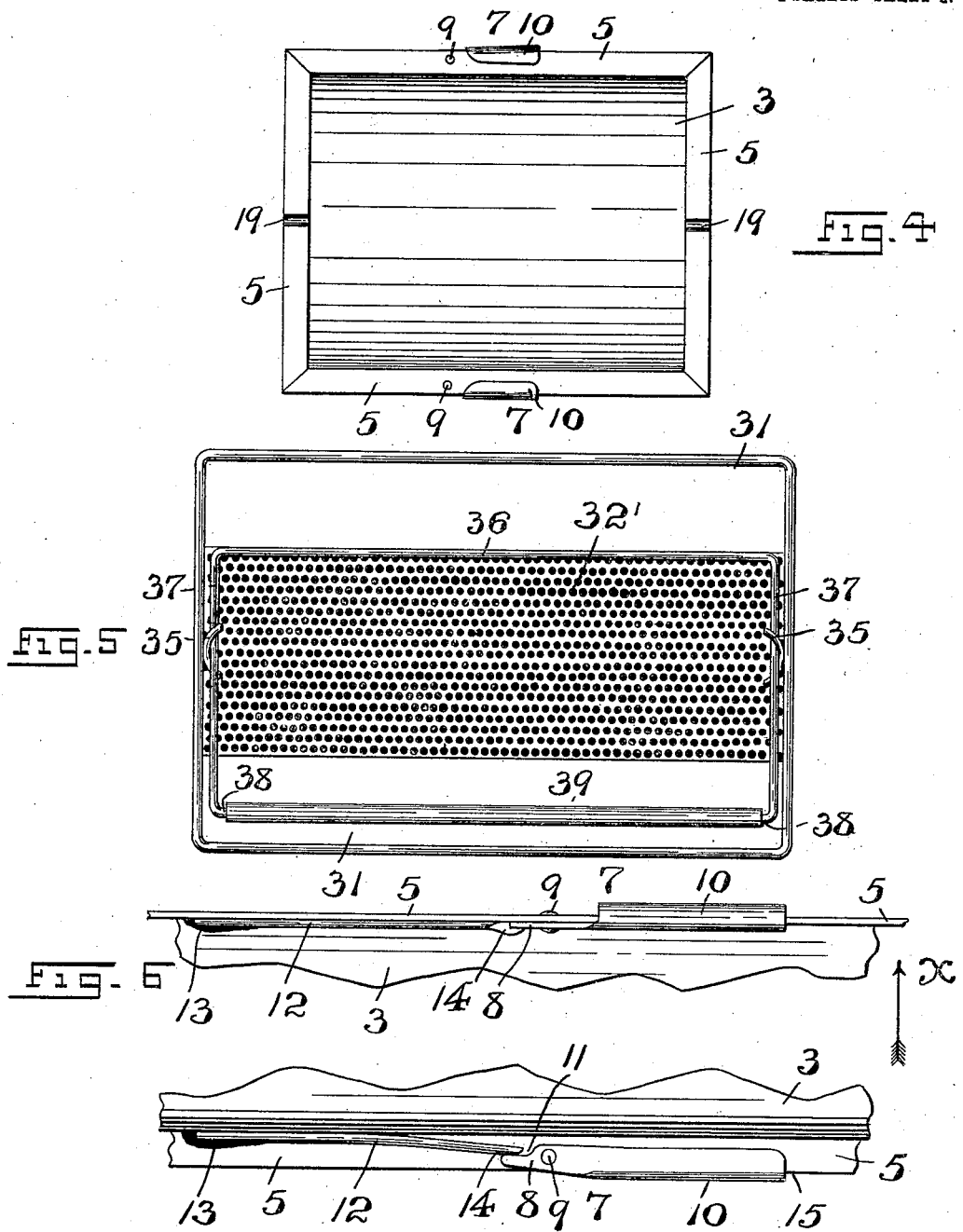

UNITED STATES PATENT OFFICE.

HARRY H. WILSON, OF BELLEVILLE, NEW JERSEY.

DOUGH-MIXING APPARATUS.

946,300.   Specification of Letters Patent.   Patented Jan. 11, 1910.

Application filed March 14, 1908. Serial No. 421,029.

*To all whom it may concern:*

Be it known that I, HARRY H. WILSON, citizen of the United States, residing at Belleville, in the county of Essex and State of New Jersey, have invented certain new and useful Improvements in Dough-Mixing Apparatus; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in that class of apparatus which are employed for the mixing and kneading of dough; and, this invention has for its principal object to provide a novel and simply constructed apparatus for the purposes of mixing and kneading dough, the device being also adapted for use as a dough-raising means, the movable mechanism within the mixing compartment being arranged and constructed in such a manner, so that the dough, as it is being mixed into a plastic mass, receives a rolling and twisting motion, and at the same time is being picked up by the kneading-mechanism, so as to produce a thoroughly mixed dough for bread, pie, biscuit, cake, and the like.

A further object of this invention is to provide an apparatus of the general character hereinafter set forth, in which the parts comprising the kneading-mechanism have been reduced to a minimum, and to provide a device in which the usual arrangement of agitator or mixing arms is dispensed with, and still provide a mechanism which will readily and properly mix and knead the dough with the least expenditure of force or power that has to be exerted by the operator in working the movable parts of the apparatus.

Other objects of this invention not at this time more particularly enumerated will be clearly understood from the following detailed description of the invention.

With the various objects of my present invention in view, the said invention consists, primarily, in the novel dough-mixing and kneading apparatus; and, the invention consists, furthermore, in the various novel arrangements and combinations of devices and parts, as well as in the details of the construction of the same, all of which will be hereinafter more fully described, and then finally embodied in the clauses of the claims which are appended to and which form an essential part of this specification.

The invention is clearly illustrated in the accompanying drawings, in which:—

Figure 1 is a central longitudinal section of a dough mixing and kneading apparatus, embodying the principles of the present invention; Fig. 2 is an end view of the same; and Fig. 3 is a transverse vertical section of the apparatus. Fig. 4 is a top or plan view of the lower main section of the apparatus, with the mixing or kneading mechanism removed. Fig. 5 is a top or plan view, on a slightly enlarged scale, of the flour-sifting device. Fig. 6 is a side view, on a still larger scale, of a portion of the lower main section of the apparatus, and a catch pivotally connected therewith, and Fig. 7 is a bottom view of the parts shown in said Fig. 5, looking in the direction of the arrow *x*.

Similar characters of reference are employed in all of the above described views, to indicate corresponding parts.

Referring now to the said drawings, the reference-character 1 indicates the complete apparatus for the mixing and kneading of dough, and which may also be used for the purpose of raising the dough, after the same has been thoroughly mixed and kneaded by the rolling and twisting motion and the constant picking-up operation of the mechanism contained in the mixing compartment 2 of the apparatus. This compartment consists, essentially, of a pair of separably connected main sections or members 3 and 4, which are adapted to be fitted upon each other on their marginal flanges 5 and 6, substantially as illustrated in the several figures of the drawings, and then locked or held in place by means of suitably disposed and suitably constructed clamping or locking devices, as 7. In practice, I prefer to use one of these clamping devices upon each side of the apparatus, each device being provided with a part 8, which is perforated, and is pivotally secured by means of a pin or rivet 9 to the under side of the flange 5 of the lower main section or member 3.

The main portion of each clamping device is doubled-over upon itself to provide a U-shaped holding or clamping element 10 which is adapted to be arranged over and clamp the opposite faces of the two flanges 5 and 6 when arranged upon each other. The part 8 is preferably cut-away in such a manner, as to provide a recessed edge-portion 11, and the reference-character 12 indicates a spring-bar or stem which is suitably secured at one end, by means of solder 13, or otherwise, to the under face of the flange 5, and has its other free end-portion 14 extending into the recessed edge-portion 11 and bearing directly against the finger or part 8, as clearly illustrated in Figs. 6 and 7 of the drawings, so that when the upper main section has been removed from the lower main section, the clamping devices will return to their normal initial positions close to the edge 15 of the flange, and will not extend at an angle from the edge of the flange and consequently will not remain in an awkward position at either side of the apparatus. The said two main body-sections or members 3 and 4 are preferably of the cross-section shown, but it will be understood, however, that I do not limit myself to these shapes and forms of the said sections or members 3, and that the said sections may be of any other suitable and desirable cross-section.

As shown, the lower main section or member 3 is supported upon suitable standards 16, while the upper main section or member 4 is made with a suitable opening 17, which can be closed by means of a lid or door 18 during the raising process of the dough when the upper sifting device, which is to be hereinafter more fully described, has been removed. The said main sections or members 3 and 4 are provided in their ends with suitably arranged semi-circular openings 19, and correspondingly formed bearings 20 which are secured to the outer faces of said ends by means of rivets 21 or other suitably formed fastening devices. Rotatively arranged in the said bearings are the end-portions or journals 22 and 23 of an agitator or mixing or kneading mechanism. This device or mechanism is made, preferably, as illustrated in Figs. 1 and 3 of the drawings, and it consists of the said journals 22 and 23 from which extend in inward directions into the said compartment 2, the respective bearing-portions 24 and 25. Extending downwardly and angularly outwardly from the said respective portions 24 and 25, and toward the inner faces of each end of the main compartment 2 of the device, are suitably formed arms 26 and 27, and connecting with and extending from each lower end of said arms 26 and 27 is a spirally formed mixing or kneading member or element 28. That there may be no lateral movement of the agitator or mixing or kneading element within the mixing chamber or compartment 2, the journals are provided with collars or annular shoulders 29, substantially as shown. When the agitator or mixing or kneading mechanism has been mounted in the said bearings formed by the semi-cylindrical openings in the sides of the device or apparatus, and the bearing devices 20, a crank-arm 30 or other suitable actuating means is secured to one of the said journals, as 23, for actuating the said agitator or mixing or kneading member. As shown in the drawings, the said helically formed member or element 28 is made in the form of a single helix of one complete turn which acts to pick up the dough, during the revolutions of the same, at the same time producing a combined rolling and twisting motion of the dough as it is being formed into a plastic mass, and whereby the dough is perfectly kneaded. This picking-up of the mass and the production of the rolling and twisting of the mass of dough is the same, no matter in which direction the element or member 28 is moved; and, I have found in practice that the best results, with the least expenditure of power, are obtained by moving the element or member 28 first in one direction, and then moving it in the opposite direction. The angular arrangement of the arms 26 and 27 prevents the accumulation of the dough upon the inner surfaces of the ends of the sections 3 and 4, and thus keep the said surfaces clean and clear of the sticky mass of dough during the mixing and kneading operations. Owing to the large open space within the center of the compartment 2, formed by the two closed main sections 3 and 4, and furthermore, owing to the combined rolling and twisting motion of the dough-mass, preferably, alternately in the opposite directions from end to end of the apparatus, the possibility of the dough becoming bunched or entwined in a solid mass within the central portion of the mixing chamber is entirely obviated, and the dough is thereby thoroughly mixed and kneaded. The said element or member 28 rotating in close proximity to the inner surfaces of the two main sections 3 and 4, and at the same time, traveling in the manner of a screw, produces a shear-like operation whereby the interior surfaces of the said sections 3 and 4 are always kept clear of the dough which is prevented from sticking fast upon the inner surfaces of the mixing compartment, as will be clearly evident.

Suitably disposed and removably arranged above the upper main section 4 of the mixing and kneading compartment 2 is a flour-holding and sifting device made in the form of a compartment or receiver, as will be clearly seen from an inspection of Figs. 1, 2, 3 and 5.

The device consists, essentially, of a semi-cylindrical or other suitably formed trough-shaped shell or member 31 which is open at the top and bottom, a screen or sieve-like plate or element 32' being suitably secured within the shell or member 31, over its open bottom, the parts being also arranged above the opening 17 of the mixing compartment in such a manner, that a free circulation and passage of air between said shell or member 31 and the mixing compartment may be had, and allow the sifted flour to pass directly from said shell or member 31 into the mixing compartment 3, as will be clearly understood. To obtain this open space, the upper main section 4 has suitably secured upon its ends suitably formed holding devices or elements, which, as will be seen from an inspection of Fig. 2 of the drawings, are of a U-shaped configuration, each device comprising a U-shaped body-portion 32 provided with an outwardly extending and correspondingly formed rib or projection 33, all arranged to receive correspondingly formed legs 34 with which the sifting-shell is provided, said legs extending downwardly from the ends of the shell or member 31 and being adapted to dove-tail with the U-shaped holding devices or elements, so as to positively affix the sifting device in its operative position above the mixing or kneading compartment. Extending inwardly from the inner faces of said shell or member 31 are suitably formed U-shaped guides 35, which are preferably made of wire, and mounted between the fingers of said oppositely located guides, so as to be capable of oscillation within the sifting compartment of the shell or member 31, are the vertically disposed side-members or arms 37 of an agitator for stirring up the dry flour contained in said sifting compartment. This stirrer or agitator is usually made in the form of an open frame of wire, the lower ends of said side-members 31 being connected by a bottom-rod 36, and at their upper ends said side-members or arms 37 being connected by a tap-rod 38 which is provided with a handle 39. By means of this handle the said frame-like stirrer or agitator can be moved back and forth, its arms or side-members 37 oscillating between the fingers of the guides 35, and the lower rod 36 being moved back and forth over the screen or sieve-like plate or element 32' of the sifting compartment so as to sift the dry flour into the mixing compartment, as required.

After the dough has been properly mixed and kneaded, the sifting attachment can be removed and the lid or door 18 closed down over the opening 17, so as to permit that portion of the apparatus comprising the two main sections 3 and 4 to be used for raising purposes.

It will be evident from the foregoing description of my present invention, that I have produced a simply constructed and efficiently operating device in which the dough can be easily and properly mixed and kneaded without a great expenditure of power, on account of the helical or spiral shape of the mixing mechanism within the mixing chamber, the single helix at every turn of the crank-arm making but a single revolution; and, in spirally cutting through the dough does not merely pick up the dough, but at the same time produces a most desirable effect upon the dough in that it also rolls and twists the same.

Of course I am aware that some changes may be made in the various arrangements and combinations of devices and parts as described in the foregoing specification and as illustrated in the accompanying drawings, without departing from the scope of my present invention as defined in the claims which are appended to this specification. Hence I do not limit this invention to the precise arrangements and combinations of the parts as described in the previous specification, nor do I confine myself to the exact details of the construction of any of the said parts as illustrated in the accompanying drawings.

I claim:

1. In a dough-mixing apparatus, the combination with a casing comprising a pair of separably connected members, said members being provided with bearing-portions, of an agitator rotatably arranged in said casing, said agitator consisting of a pair of journals arranged in said bearing portions, an arm extending at an angle from each journal in a direction along the inner face of each end-member of the casing, and a single helical kneading member between and connected with said arms, all arranged to avoid a central shaft extending centrally through said casing, so as to overcome the bunching of the dough in a sticky mass, substantially as and for the purposes set forth.

2. In a dough-mixing apparatus, the combination with a casing comprising a pair of separably connected members, said members being provided with bearing-portions, of an agitator rotatably arranged in said casing, said agitator consisting of a pair of journals arranged in said bearing-portions, each journal being formed with an inwardly extending portion within the casing, an arm extending at an angle from each inwardly extending portion in a direction along the inner face of each end-member of the casing, and said arms projecting also in opposite directions toward the inner face of said end-members, and a single helical kneading member between and connected with said arms, all arranged to avoid a central shaft extending centrally through said casing, so as to overcome the bunching of the dough in a sticky mass, substantially as and for the purposes set forth.

3. In a dough-mixing apparatus, the combination, with a casing consisting of a lower body-section, and an upper body section adapted to be placed upon said lower body section so as to provide a mixing compartment, each body-section being provided with a surrounding flange, of spring-actuated holding devices pivotally connected with one of said flanges, each holding device being formed with a clamping member adapted to embrace portions of the flanges of said body-sections, so as to retain them in their closed relation, said spring-actuated holding devices being adapted to retain said clamping members out of the path of the upper body-section for closing the same, and an agitator in said mixing compartment, substantially as and for the purposes set forth.

4. In a dough-mixing apparatus, the combination, with a casing consisting of a lower body-section, and an upper body section adapted to be placed upon said lower body section so as to provide a mixing compartment, each body-section being provided with a surrounding flange, of spring actuated holding devices pivotally connected with one of said flanges, each holding device being formed with a clamping member adapted to embrace portions of the flanges of said body-sections, so as to retain them in their closed relation, said spring-actuated holding devices being adapted to retain said clamping members out of the path of the upper body-section for closing the same, said body-sections being provided in their ends with semi-circular openings and corresponding bearing-plates forming bearings, and an agitator in said mixing compartment comprising a pair of bearing-portions, and a single helical member composed of one complete turn and arranged between said bearing-portions, substantially as and for the purposes set forth.

5. In a dough-mixing apparatus, the combination, with a casing consisting of a lower body-section, and an upper body section adapted to be placed upon said lower body section so as to provide a mixing compartment, each body-section being provided with a surrounding flange, of pivot-pins on one of said flanges, and a holding device mounted upon each pivot-pin, each holding device comprising a main body formed with a doubled-over clamping portion adapted to embrace portions of the flanges of said body-sections, and a spring secured at one end to the flange to which the holding device is pivoted, said spring having another portion bearing against the holding device for retaining said holding device out of the path of the upper body-section for closing the same, substantially as and for the purposes set forth.

6. In a dough-mixing apparatus, the combination, with a casing consisting of a lower body-section, and an upper body section adapted to be placed upon said lower body section so as to provide a mixing compartment, each body-section being provided with a surrounding flange, of pivot-pins on one of said flanges, and a holding device mounted upon each pivot-pin, each holding device comprising a main body formed with a doubled-over clamping portion adapted to embrace portions of the flanges of said body-sections, a finger extending from and forming with the body of the holding device a recessed part, and a spring secured at one end to the flange to which the holding device is pivoted, said spring having another portion extending into said recessed part and bearing against the finger of said holding device for retaining said holding device out of the path of the upper body-section for closing the same, substantially as and for the purposes set forth.

7. In an apparatus for mixing dough, the combination, with a mixing compartment consisting of upper and lower separable body-sections, an agitator in said mixing compartment, a receiving member at each end of said upper body-section, each receiving member comprising an open U-shaped body formed with an outwardly projecting U-shaped rib, forming holding guides, and a sieve-provided flour-holding and sifting compartment having legs removably arranged in the guides formed by said receiving members and supported by said U-shaped ribs, said sifting compartment comprising a trough-shaped shell formed with closed sides and ends and with an opening in the top and bottom respectively, a sieve within said shell, said sieve being arranged above the open bottom of the shell, U-shaped guides extending inwardly from the ends of said shell, and an oscillating stirring element consisting of side-members removably mounted between said guides, a bottom-rod arranged between and connected with the lower ends of said side-members, a top-rod arranged between and connected with the upper ends of said side-members, and a handle mounted upon said top-rod, substantially as and for the purposes set forth.

8. In an apparatus for mixing dough, the combination with a mixing compartment consisting of upper and lower separable body-sections, an agitator in said mixing compartment, a receiving member at each end of said upper body-section, each receiving member comprising an open U-shaped body formed with an outwardly projecting U-shaped rib, forming holding guides, said upper body-section having an opening and a hinged lid for closing said opening, and a sieve-provided flour-holding and sifting compartment having legs removably arranged in the guides formed by said receiving members and supported by the said U-shaped ribs, said sifting compartment comprising a trough-shaped shell formed with closed sides and ends and with an opening in the top and bottom respectively, a sieve within said shell, said sieve being arranged above the open bottom of the shell, U-shaped guides extending inwardly from the ends of said shell, and an oscillating stirring element consisting of side-members removably mounted between said guides, a bottom-rod arranged between and connected with the lower ends of said side-members, a top-rod arranged between and connected with the upper ends of said side-members, and a handle mounted upon said top-rod, substantially as and for the purposes set forth.

In testimony, that I claim the invention set forth above I have hereunto set my hand this 13th day of March, 1908.

HARRY H. WILSON.

Witnesses:
FREDK. C. FRAENTZEL,
F. H. W. FRAENTZEL.